United States Patent [19]

Rasinski

[11] 4,286,309
[45] Aug. 25, 1981

[54] DETACHABLE VEHICLE LIGHTING FIXTURE

[76] Inventor: Clarence Rasinski, 2516 W. 70-1/2 St., Richfield, Minn. 55423

[21] Appl. No.: 119,460

[22] Filed: Feb. 7, 1980

[51] Int. Cl.³ .............................................. F21V 21/22
[52] U.S. Cl. ..................................... 362/61; 362/250; 362/285; 362/396; 362/418; 280/414 R
[58] Field of Search ................... 362/61, 82, 83, 249, 362/250, 267, 285, 418, 234, 390, 396, 78, 80; 340/135, 87; 280/414 R

[56] References Cited

U.S. PATENT DOCUMENTS

| 910,066 | 1/1909 | Jackson . | |
|---|---|---|---|
| 984,563 | 2/1911 | Holmes . | |
| 1,137,773 | 5/1915 | Marsden . | |
| 1,500,601 | 7/1924 | Brewster | 340/135 |
| 1,797,540 | 3/1931 | Bamford . | |
| 1,848,235 | 3/1932 | Wiley . | |
| 2,560,200 | 7/1951 | Werzyn . | |
| 2,783,367 | 2/1957 | Locke . | |
| 2,907,295 | 10/1959 | Delaney | 362/80 X |
| 3,008,679 | 11/1961 | Powell . | |
| 3,059,105 | 10/1962 | Roe et al. . | |
| 3,080,581 | 3/1963 | Smihal | 362/396 |
| 3,083,292 | 3/1963 | Roe et al. . | |
| 3,278,741 | 10/1966 | Wood | 362/61 |
| 3,541,321 | 11/1970 | Spiteri . | |
| 3,691,366 | 9/1972 | Spaeuer | 340/87 |
| 3,885,146 | 5/1975 | Whitley | 362/249 |
| 3,887,093 | 6/1975 | Howell | 362/61 |
| 4,091,442 | 5/1978 | Markey . | |
| 4,151,439 | 4/1979 | Moss . | |
| 4,197,573 | 4/1980 | Thatch | 362/396 |

*Primary Examiner*—L. T. Hix
*Assistant Examiner*—Alan Mathews
*Attorney, Agent, or Firm*—Merchant, Gould, Smith, Edell, Welter & Schmidt

[57] ABSTRACT

A detachable vehicle lighting fixture (10) for use with towed vehicles (50) is disclosed. The fixture (10) includes a shaft (12) which can be adjusted in length. Lights (14) are mounted proximate either end of the shaft (12). The fixture (10) further includes a pair of retention arms (42) extending from the shaft (12), each of the retention arms (42) having a friction pad (54) mounted at a clamping end (46) thereof.

6 Claims, 5 Drawing Figures

U.S. Patent
Aug. 25, 1981
4,286,309
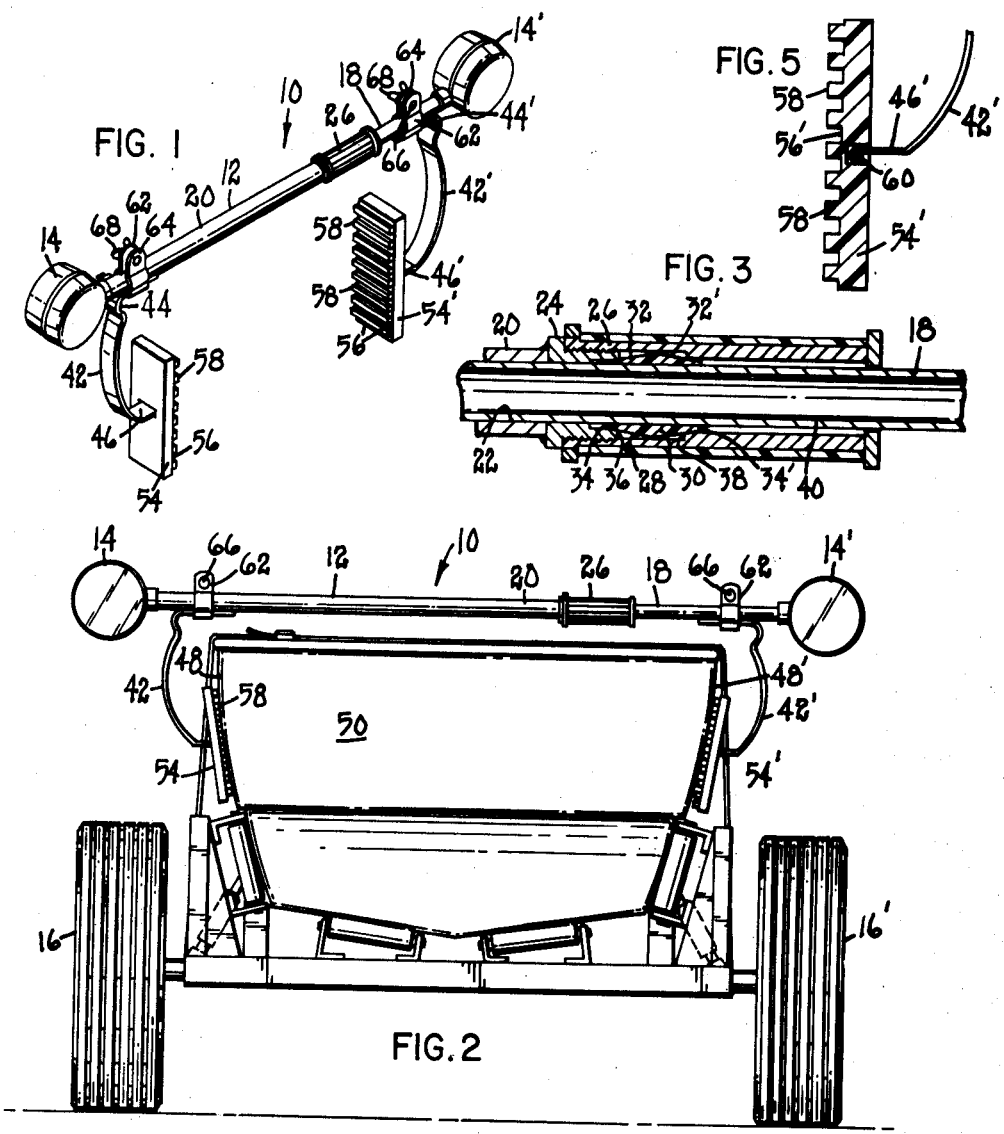
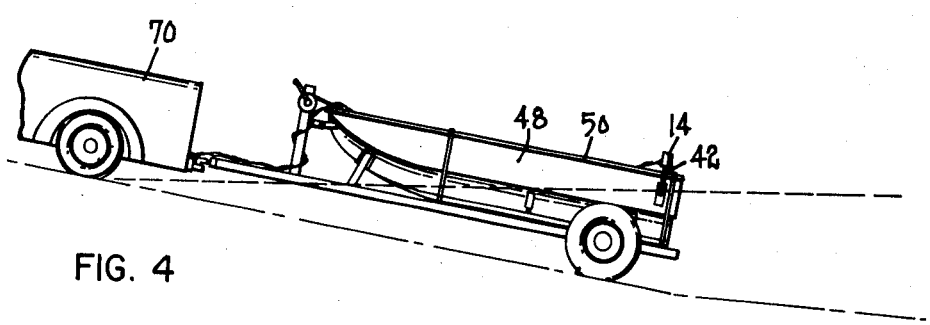

DETACHABLE VEHICLE LIGHTING FIXTURE

TECHNICAL FIELD

This invention relates generally to the field of lighting fixtures. More specifically, it relates to braking indication lighting fixtures for use with towed vehicles.

BACKGROUND OF THE PRIOR ART

Recreational vehicles such as boats and snowmobiles are usually transported from one location to another by use of a towed trailer on which the recreational vehicle is mounted. Typically, these trailers are towed by a family automobile or other powered vehicle having a towing rig mounted at the back end thereof.

Laws in many states require that vehicle lighting systems be mounted at the rear end of the trailer. These systems include night driving light, backing lights, and braking lights.

In structures known in the art, these lights, typically, are fixedly mounted to the towed trailer. The specific locations across the rear end of the towed vehicle and the heights above the ground at which the lights are mounted vary from vehicle to vehicle. Invariably, however, the positioning of the lights is such that significant problems are encountered when the recreational vehicle carried by the trailer is a boat.

Launching of a boat mounted to such a trailer is usually accomplished in the following manner. A ramp is provided at the launching site angling downward into the water, and the trailer may be backed down the ramp until the boat is at a position with respect to the surface of the water at which the boat, when the gripes securing it to the towed trailer are removed, will be flotatably supported on the surface of the water because of its natural buoyancy. A portion of the trailer is, necessarily, submerged in effecting this launching procedure. The portion of the trailer which becomes submerged depends upon the configuration of the trailer and the angle of the ramp with respect to the surface of the water.

Even where the sloping of the launching ramp is gradual, the lighting system of the trailer is likely to become submerged prior to the time the boat is at its release position. Since the trailer is backed to this release position, the backing lights are on during the performance of the evolution. Depending upon the extent of prior use of the lights and the length of time in completing the evolution, the lights may become very hot. There can, therefore, be a significant temperature differential between the lights and the body of water in which the boat is being placed. Frequently, because of this temperature differential, the light bulbs explode.

Even in warmer bodies of water where the temperature differential is not sufficient to cause explosion of the lights, direct exposure to the water can induce corrosion of the metal components of the lighting fixtures. Corrosion will be particularly acute when the trailer is, on numerous occasions, backed into a body of salt water. As the fixtures corrode, they concurrently deteriorate.

It is these problems in the art which the invention of the present application is designed to overcome. It provides a structure which can be detached and raised to an appropriate height so that, as the trailer is backed down the ramp, the lights and their appurtenant fittings do not come in contact with the water.

BRIEF SUMMARY OF THE INVENTION

The present invention is a portable lighting fixture which can be used when towing various recreational vehicles. The fixture includes a pair of lights which are spaced from one another along an axis. It can be attached to the hull of a boat being towed by use of a pair of retaining arms. Each of the arms extends away from the fixture at which it is affixed by an attachment end of the arm. An opposite clamping end of each arm is provided to apply pressure to the structure to which the fixture is mounted. At least one of the retaining arms is resilient and is inwardly biased toward the opposite arm of the pair to effect quick and simple attachment or disengagement of the fixture.

The arms can be maintained spaced with respect to one another along a shaft having a longitudinal axis coinciding with the axis with respect to which the lights are spaced. The lights can be attached to the shaft, being either fixedly attached at either end thereof or mounted to appendages extending from the shaft proximate its ends. The shaft can be made length adjustable so that the lights can be positioned to accurately demarcate the widest point of the load being towed.

A pad having an inwardly facing friction surface can be mounted at each clamping end of the arms. The pads can be pivotally mounted on the arms so that they can adjust to the surface of the vehicle to which the fixture is being attached. Because of the nature of the use of the fixture, pivoting can be made to occur about axes perpendicular to a plane which can be defined by the arms.

In one embodiment of the invention, the friction surface can include a series of generally parallel rubber ridges. The ridges can be made to extend parallel to one another and to the axis about which the pad rotates.

The invention of this application is thus a portable lighting fixture which can readily be attached and removed from the vehicle with which it is used. The specific advantages of the invention will become apparent with reference to the accompanying drawing, detailed description of the invention, and claims.

BRIEF DESCRIPTION OF THE DRAWING

FIG. 1 is a view in perspective of one embodiment of the invention of the present application;

FIG. 2 is a rear elevational view of the embodiment of FIG. 1 attached to a towed vehicle;

FIG. 3 is a fragmentary sectional view of a shaft length adjustment assembly;

FIG. 4 is a side elevational view of a boat to which the invention of this application can be attached being lowered into the water and showing the location of the structure of the present application relative to the water; and FIG. 5 is a fragmentary side sectional view of a friction pad.

DETAILED DESCRIPTION OF THE INVENTION

Referring now to the drawing wherein like reference numerals denote like elements throughout the several views, FIG. 1 shows one embodiment of the lighting fixture 10 in accordance with the present application. The embodiment illustrated includes an elongated member or shaft 12 and a pair of lights 14, 14', each of the pair of lights 14, 14' being mounted at one of opposite ends of the shaft 12. The lights 14, 14' are, thereby, spaced from one another along a longitudinal axis of the shaft 12. The invention does not, however, specifically require that the lights 14, 14' be positioned on the axis, as shown in the embodiment illustrated in FIGS. 1 and 2. The shaft 12 may include appendages to which the lights 14, 14' are mounted and which diverge from the longitudinal axis, and the lights 14, 14' can, thereby, be maintained spaced from one another with respect to the axis even though they are not positioned thereon.

Since it is frequently desirable to position the light demarcating the widest extension 16, 16' of the towed trailer 70 as illustrated in FIG. 2, the shaft 12 can be made length adjustable so that the lights 14, 14' can be selectively positioned at different distances from one another. Making the shaft length adjustable can be accomplished by use of various structures presently known in the art. One suitable method is illustrated in FIG. 3. The shaft 12 can be made to include an inner rod 18 and an outer member 20 having an elongated channel 22 formed axially therethrough to accommodate the inner rod 18 so that the two components may slide axially relative to each other. The outer member 20 can have, at an end at which the inner rod 18 enters, a male threaded extension portion 24. A sleeve 26, encircling the inner rod 18, can be threaded along its inner surface 28 to mesh with the threads of the male extension portion 24 of the outer member 20.

Closely surrounding the inner rod 18 is positioned a collar 30 having ramp portions 32, 32' extending from either axial end 34, 34' thereof outwardly and toward the axial middle of the collar 30. An annular shoulder 36 of the outer member 20 is made to engage one of these axially extending ramps 32, and an annular shoulder 38 formed on the inner surface 28 of the sleeve 26 can be made to engage the second axially extending ramp 32'. As the sleeve 26 is tightened onto the outer member 20 by rotating it relative to the outer member 20, these two shoulders 36, 38 approach each other and they ride up the axially extending ramps 32, 32'. The net effect of the shoulders 36, 38 riding up the ramps 32, 32' is to exert radially inward pressure upon the collar 30 and cause it to impinge upon the outer surface 40 of the inner rod 18. The inner rod 18 can thus be selectively retained in one position relative to the outer member 20, permitted to slide axially with respect to the outer member 20 by loosening the sleeve 26, and maintained in another position by again tightening the sleeve 26.

The lighting fixture 10 further includes a pair of retaining arms 42, 42'. Each arm has a first end, or attachment end 44, 44', at which they are mounted along the longitudinal axis of the shaft 12 of the embodiment of FIG. 1.

Each arm 42, 42' includes a second end or clamping end 46, 46' for engagement of the side 48, 48' of the vehicle 50 to which the fixture 10 is to be attached. The embodiment of FIGS. 1 and 2 illustrates a structure wherein both arms 42, 42' are resilient and inwardly biased toward one another, and the invention can be so structured for ease of attachment. It, however, specifically contemplates embodiments wherein one of the arms 42, 42' is rigid and non-resilient. Attachment to the towed vehicle 50 can be accomplished by first causing the clamping end of the rigid arm to engage one side 48, 48' of the vehicle 50 and then overcoming the bias of the resilient arm so that the clamping end of that arm can engage the opposite side 48, 48' of the vehicle 50.

In order to minimize damage to the vehicle 50 to which the fixture 10 is being attached and to effect better securing of the fixture 10 to the vehicle 50, a pad 54, 54' can be mounted to each arm 42, 42' at its second or clamping end 46, 46'. Each pad 54, 54' can have an inwardly facing friction surface 56, 56' so that, when the fixture 10 is attached to the vehicle 50 with which it is to be used, bumps and sudden stopping and starting will not cause the fixture 10 to be ejected from the vehicle 50 or to be displaced along the side thereof. Use of one of numerous types of friction surfaces is appropriate. One type which has been found to be particularly effective is one wherein a series of rubber ridges 58 extend across the inwardly facing surface of the pad 54, 54' in a direction generally perpendicular to a plane defined by the retention arms 42. Although it is undesirable for the fixture 10 to be displaced laterally along the side 48 of the vehicle 50 being towed, it is particularly important that, when the fixture 10 is attached from the top of the vehicle 50, it not be ejected upward and off the vehicle 50. A friction surface having a series of generlly parallel rubber ridges 58 as hereinbefore described proves particularly resistant to jarring of the fixture 10 in a direction in which it may be dislodged from the vehicle 50.

Since hulls of boats to which the structure of the present invention is frequently attached are varying in curvature, it is a desirable feature for a fixture utilizing clamping pads 54 to have those pads mounted so that they can adapt to the surface of the boat or other vehicle. This can be accomplished by pivotally mounting the pads 54 for rotation about axes 60 which extend generally perpendicular to a plane defined by the retention arms 42. As the fixture 10 is attached to the vehicle 50, the pads 54 will pivot about these axes 60 until they lie in planes generally parallel to planes coinciding with the surface of the side of the vehicle 50 or planes tangent to the surface.

If the retaining arms 42 are mounted to the shaft 12 at fixed distances from one another, the size of the vehicle 50 to which the fixture can be attached is a function of the fixed distance between the arms 42 and, if only one arm is resilient, the length of that arm. For this reason, it is desirable to mount the retention arms 42 to the shaft 12 by use of an attachment member 62 or members which allow selected positioning of the arms 42 at various points along the shaft 12. Only one of the attachment members 62 need be configured for movement along the shaft 12 in order to provide the fixture 10 with this distance-varying feature. Both arms 42, 42' can, however, extend from attachment members 62 which are position adjustable. An embodiment can be so structured to afford greater convenience to the user.

Methods of making the arms 42 position adjustable are known in the art. One method illustrated in FIG. 1 includes an attachment member 62 having spaced tabs 64 which can be brought together so that the attachment member 62 impinges upon the shaft 12. The tabs 64 can have apertures formed therethrough, and a bolt 66 can be inserted through aligned apertures. A wing nut 68 can be threaded onto the bolt 66 and tightened to cause the gap between the tabs 64 to narrow and, thereby, accomplish secure attachement.

One embodiment of the lighting fixture 10 can be manufactured having electrical connectors which extend from the lights 14. The fixture 10 can be sold with adaptor means for connection at the lights 14 themselves to fittings compatible with the electrical system of the towing vehicle 70.

Numerous characteristics and advantages of my invention have been set forth in the foregoing description. It will be understood, of course, that this disclosure is, in many respects only illustrative. Changes can be made in details, and the structures so made may yet fall within the scope of the invention. The scope of my invention is defined by the language of the appended claims.

What is claimed is:

1. A detachable vehicle lighting fixture, comprising:
   a length adjustable elongated member having opposite ends;
   a brake light mounted proximate each end of said elongated member;
   a pair of resilient cantilever retaining arms, each arm of said pair having a first and a second end; and
   means mounting each arm of said pair by said first ends to said elongated member, at least one of said arms being adapted for movement along said elongated member toward and away from the other of said arms;
   said arms biased toward one another.

2. The fixture of claim 1 further comprising electrical connectors extending from said lights and adaptor means for connecting said connectors to the vehicle lighting system of a towing vehicle.

3. The fixture of claim 1 further comprising a pad mounted to each arm of said pair proximate said second end, and having an inwardly facing friction surface to engage opposite sides of the vehicle.

4. The fixture of claim 3 wherein said arms define a plane and said pads are mounted for pivoting about second axes generally perpendicular to said plane.

5. The fixture of claim 4 wherein each of said friction surfaces comprises a series parallel rubber ridges, each of said ridges extending generally perpendicular to said plane.

6. The fixture of claim 1 wherein said mounting means comprises attachment members holding said arms at said first ends thereof, said attachment members being slidably mounted to said elongated member for selective positioning along the length thereof.

* * * * *